United States Patent
Lovegren et al.

(10) Patent No.: US 6,445,192 B1
(45) Date of Patent: Sep. 3, 2002

(54) CLOSE PROXIMITY MATERIAL INTERFACE DETECTION FOR A MICROWAVE LEVEL TRANSMITTER

(75) Inventors: Eric R. Lovegren, Big Lake; David L. Pederson, Hopkins, both of MN (US)

(73) Assignee: Rosemount Inc., Eden Prairie, MN (US)

(*) Notice: Subject to any disclaimer, the term of this patent is extended or adjusted under 35 U.S.C. 154(b) by 0 days.

(21) Appl. No.: 09/542,677

(22) Filed: Apr. 4, 2000

(51) Int. Cl.[7] .................. G01R 27/04; G01F 23/00; G01S 13/08
(52) U.S. Cl. ............... 324/644; 73/290 R; 342/124
(58) Field of Search .................. 324/644, 642, 324/635, 639; 342/124, 22; 23/290 R

(56) References Cited

U.S. PATENT DOCUMENTS

| | | |
|---|---|---|
| 3,665,466 A | 5/1972 | Hibbard .............. 343/12 R |
| 3,812,422 A | 5/1974 | DeCarolis ............ 324/58.5 |
| 3,995,212 A | 11/1976 | Ross ................ 324/58.5 |
| 4,161,731 A | 7/1979 | Barr ................ 343/14 |
| 5,327,139 A | 7/1994 | Johnson ............. 342/22 |
| 5,438,867 A | 8/1995 | van der Pol ......... 73/290 |
| 5,457,990 A * | 10/1995 | Oswald et al. ....... 324/644 |
| 5,500,649 A | 3/1996 | Mowrey et al. ....... 342/22 |
| 5,599,449 A | 2/1997 | Gnamm et al. ....... 210/495 |
| 5,609,059 A | 3/1997 | McEwan ............. 73/290 R |
| 5,610,611 A | 3/1997 | McEwan ............. 342/89 |
| 5,661,251 A | 8/1997 | Cummings et al. .... 73/866.5 |
| 5,672,975 A | 9/1997 | Kielb et al. ........ 324/644 |
| 5,835,053 A | 11/1998 | Davis ............... 342/22 |
| 5,898,308 A | 4/1999 | Champion ........... 324/643 |
| 5,948,979 A | 9/1999 | Fitsch et al. ....... 73/290 V |
| 5,969,666 A | 10/1999 | Burger et al. ....... 342/124 |
| 5,973,637 A | 10/1999 | Perdue et al. ....... 342/124 |

FOREIGN PATENT DOCUMENTS

| | | |
|---|---|---|
| EP | 0 834 722 A2 | 4/1998 |
| EP | 0882956 A2 | 12/1998 |
| EP | 0882957 A2 | 12/1998 |
| EP | 0 928 974 A2 | 7/1999 |
| WO | WO 97/06448 | 7/1996 |
| WO | WO 98/24013 | 6/1998 |

OTHER PUBLICATIONS

"Micropower Impulse Radar Technology and Application", Mast et al., U.S. Dept. of Energy, Lawrence Livermore National Library, UCRL–ID 130474, Apr. 15, 1998.
"Radar Level Technology Offers Accurate, Noncontact Measurements", Fred Fitch, I&CS, Jan. 1996, pp. 27–30.
"Reflex Radar Gauging and Level Measurement for Liquids, Interface and Granular Materials", Technical Data, 12/96.

\* cited by examiner

*Primary Examiner*—N. Le
*Assistant Examiner*—J Kerveros
(74) *Attorney, Agent, or Firm*—Westman, Champlin & Kelly

(57) ABSTRACT

A method for detecting the presence of a twin peak pulse in a waveform, generated by a microwave level transmitter, that is used to detect levels of first and second material interfaces relating to materials contained in a tank. The waveform develops a twin peak pulse when the first and second material interfaces are in close proximity to one another. The twin peak pulse contains overlapping first and second received wave pulses reflected from the first and second material interfaces, respectively. The method determines that the waveform contains a twin peak pulse when both a first peak point relating to the first received wave pulse and a valley are detected. A microwave level transmitter having an interface detection module that is configured to use the method of the present invention to detect the existence of a twin peak pulse in a waveform.

46 Claims, 9 Drawing Sheets

CLOSE PROXIMITY MATERIAL INTERFACE DETECTION FOR A MICROWAVE LEVEL TRANSMITTER

BACKGROUND OF THE INVENTION

The present invention relates to transmitters used in the process control industry to measure levels of materials in storage vessels, such as tanks. More particularly, the present invention relates to a microwave level transmitter that is capable of detecting material interfaces that are separated by a small distance.

Microwave level transmitters are used in the process control industry to measure levels of materials contained in a tank by transmitting a microwave pulse into the materials contained in the tank. The microwave pulse reflects off the contents of the tank and a return profile of the tank or waveform is generated. The waveform represents the amplitude of the reflections of the microwave pulse as a function of time. Peaks in the waveform represent received wave pulses corresponding to portions of the microwave pulse that were reflected off discontinuities within the tank. These discontinuities can include various material interfaces such as an air-material interface at the surface of the material in the tank, a liquid-liquid interface, such as a layer of oil on water, a liquid-solid interface, and a solid-solid interface. The location or levels of these material interfaces can be established using common Time Domain Reflectometry (TDR) principles once the corresponding time locations of the received wave pulses or peaks in the waveform are established relative to a reference time location.

Detection of the time location of the received wave pulses generally includes analyzing the waveform for peaks which exceed a threshold value. Typically, a single received wave pulse is detected by locating starting and ending points along the waveform where the waveform crosses a threshold value. This method will fail to detect multiple received wave pulses corresponding to multiple material interfaces, however, when the received wave pulses overlap to the extent that the starting and ending points encompass more than one received wave pulse. This overlap can be due to the close proximity of the material interfaces. The portion of the waveform that includes such overlapped pulses is defined as a twin peak pulse. The typical method can only detect the time location of received wave pulses that correspond to material interfaces that are sufficiently distant such that the waveform does not contain a twin peak pulse.

One possible method of detecting overlapping received radar wave pulses of a twin peak pulse is disclosed in U.S. Pat. No. 5,969,666 to Burger et al. (Burger). The method disclosed in Burger first locates a maximum value of a waveform or echo profile and searches backwards in time to locate various maximum and minimum slopes. The maximum and minimum slopes are used to distinguish the overlapping received wave pulses of the twin peak pulse (described in Burger as a double blip). In addition to being computationally intensive, the method disclosed in Burger always presumes that the waveform contains a twin peak pulse. As a result, even when twin peak pulse is not present in the waveform, the method disclosed in Burger will unnecessarily perform computations in search of overlapping received radar wave pulses.

SUMMARY OF THE INVENTION

A method and apparatus for detecting the presence of a twin peak pulse in a microwave level transmitter is provided. A received waveform is determined to contain a twin peak pulse when both a first peak point relating to first received wave pulse and a valley are detected in the waveform. In one aspect, a microwave level transmitter includes an interface detection module that is configured to use the above method to detect the existence of a twin peak pulse in the waveform.

DETAILED DESCRIPTION OF THE PREFERRED EMBODIMENTS

The present invention relates to a microwave level transmitter that can be used to calculate the level of materials, such as liquids and solids, contained in a tank. As will be discussed in greater detail below, the microwave level transmitter of the present invention is capable of detecting or distinguishing multiple material interfaces of the materials which are in close proximity to each other. These material interfaces can be located at the surface of the material, between a first material and air, and between first and second materials. For example, material interfaces can exist between: air and a first liquid; foam and a first liquid; between first and second liquids; a liquid and a solid; and first and second solids. This aspect of the invention allows the microwave level transmitter to calculate small differences in the levels of multiple materials contained in a tank.

Figure 1:
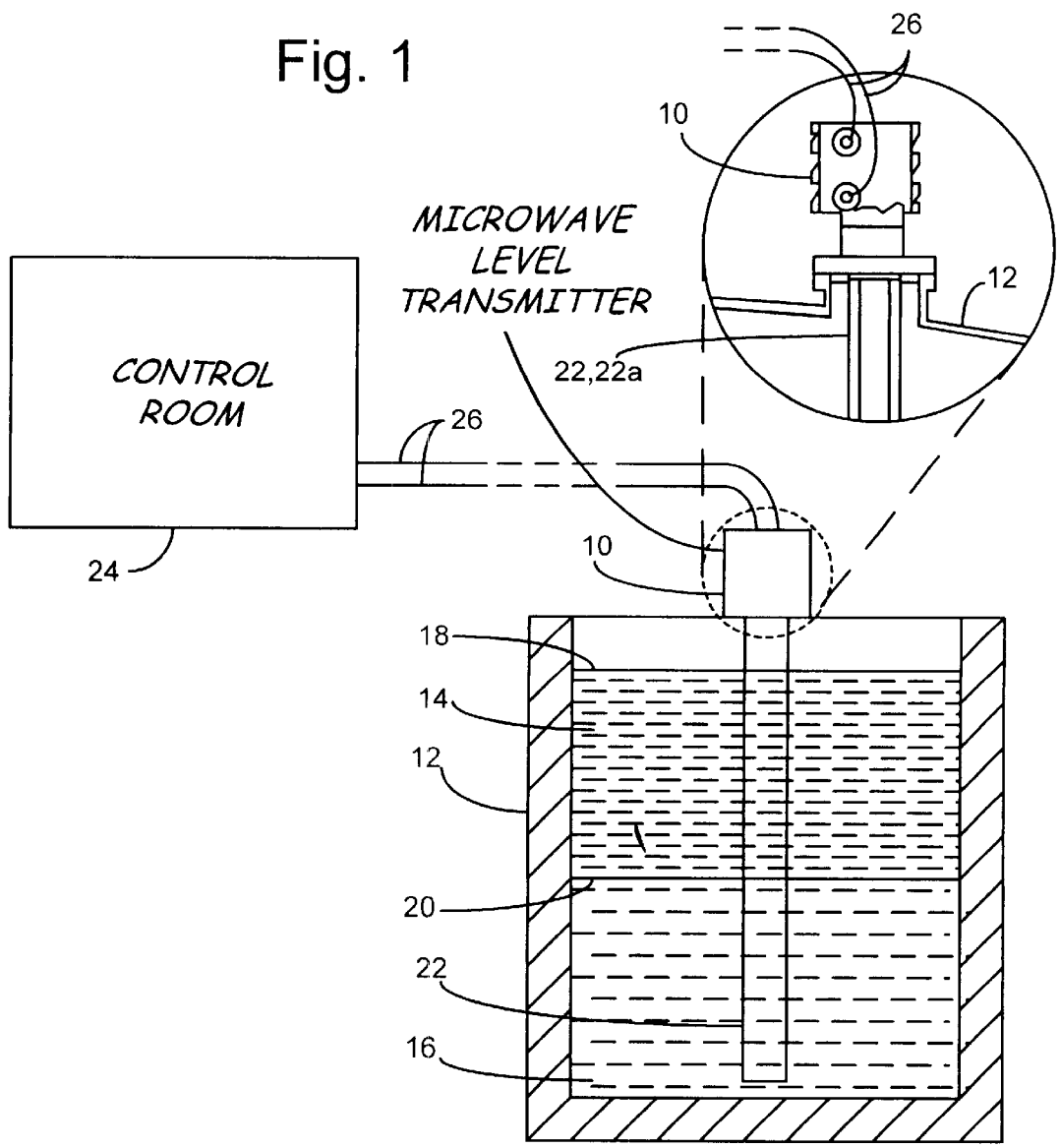
FIG. 1 is a simplified diagram showing a microwave level transmitter, in accordance with one embodiment of the invention, attached to a tank in a process plant.

FIG. 1 shows an example of the environment in which a microwave level transmitter of the present invention, generally designated as 10, operates. Microwave level transmitter 10 can be mounted on tank 12 above first and second process materials 14, 16, respectively. First material interface 18 is located at the surface of first material 14. Second material interface 20 is located at the junction between first material interface 14 and second material interface 16. Microwave level transmitter 10 attaches to radar antenna 22 which transmits a microwave pulse into first and second materials 14, 16. Portions of the microwave pulse are reflected at discontinuities located at first and second material interfaces 18, 20. These reflected portions of the microwave pulse are received by microwave level transmitter 10 as received wave pulses, which form an echo profile of the contents of tank 12. Microwave level transmitter 10 is further configured to, using known Time Domain Reflectometry (TDR) principles, calculate the levels of first and second material interfaces 18, 20, based upon the echo profile.

Figure 10B:
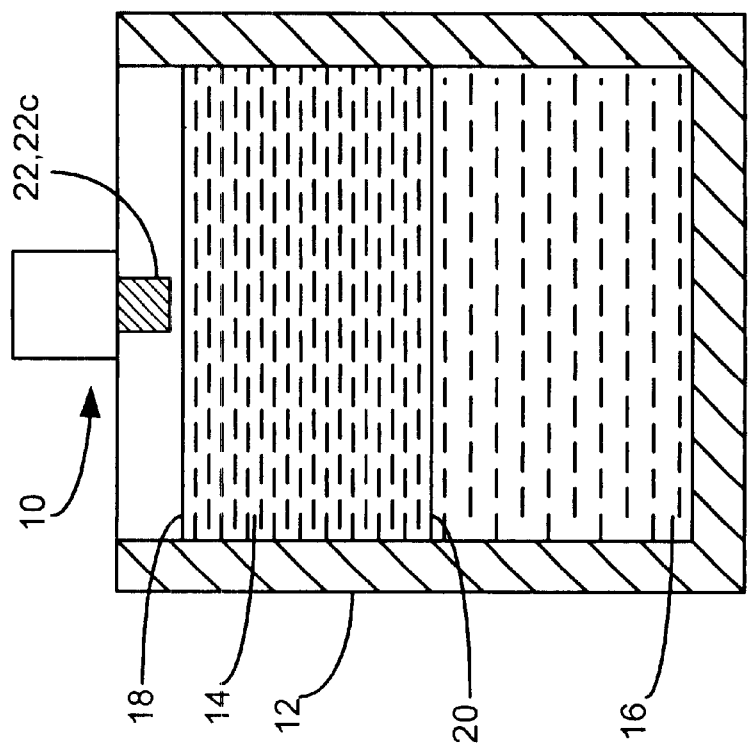
FIGS. 10a–b are simplified diagrams showing a microwave level transmitter, in accordance with one embodiment of the invention, attached to a tank in a process plant.
Figure 10A:
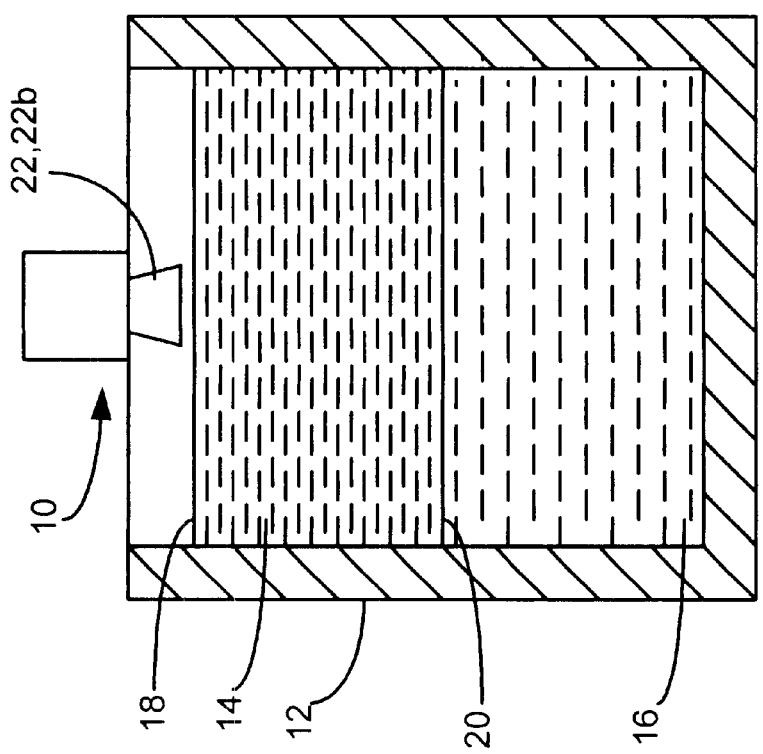

One embodiment of radar antenna 22 is waveguide 22a, shown in FIG. 1, which extends into first and second materials 14, 16. The microwave pulse is propagated along waveguide 22*a* into first and second materials 14, 16, and portions of the microwave pulse are reflected back along waveguide 22*a* off the discontinuities located at first and second material interfaces 18, 20. In the embodiment shown in FIG. 1, waveguide 22*a* is a twin lead transmission line, which is preferably terminated in a short circuit at the bottom end. It will be appreciated by those skilled in the art that many equivalent forms of waveguide 22*a* can be used with microwave level transmitter 10, such as a coaxial transmission line or a probe. Additional embodiments of radar antenna 22 include radiating horn 22*b* and rod antenna 22*c*, shown in FIGS. 10*a* and 10*b*, respectively. Radiating horn 22*b* and rod antenna 22*c* each radiate the microwave pulse into tank 12.

Referring again to FIG. 1, control room 24 is generally remotely located from microwave level transmitter 10. Control room 24 can control, and receive information from, microwave level transmitter 10 over 2-wire control loop 26. Control loop 26 can be an analog loop, using as a standard 4–20 mA analog signal, or a digital loop, which produces a digital signal in accordance with a digital communication protocol such as FOUNDATION™ Fieldbus or Profibus, or a combination loop, where a digital signal is superimposed upon an analog signal, such as with the Highway Addressable Remote Transducer (HART®). Additionally, microwave level transmitter 10 can be a low power transmitter, which is completely powered by energy received over control loop 26.

Figure 2:
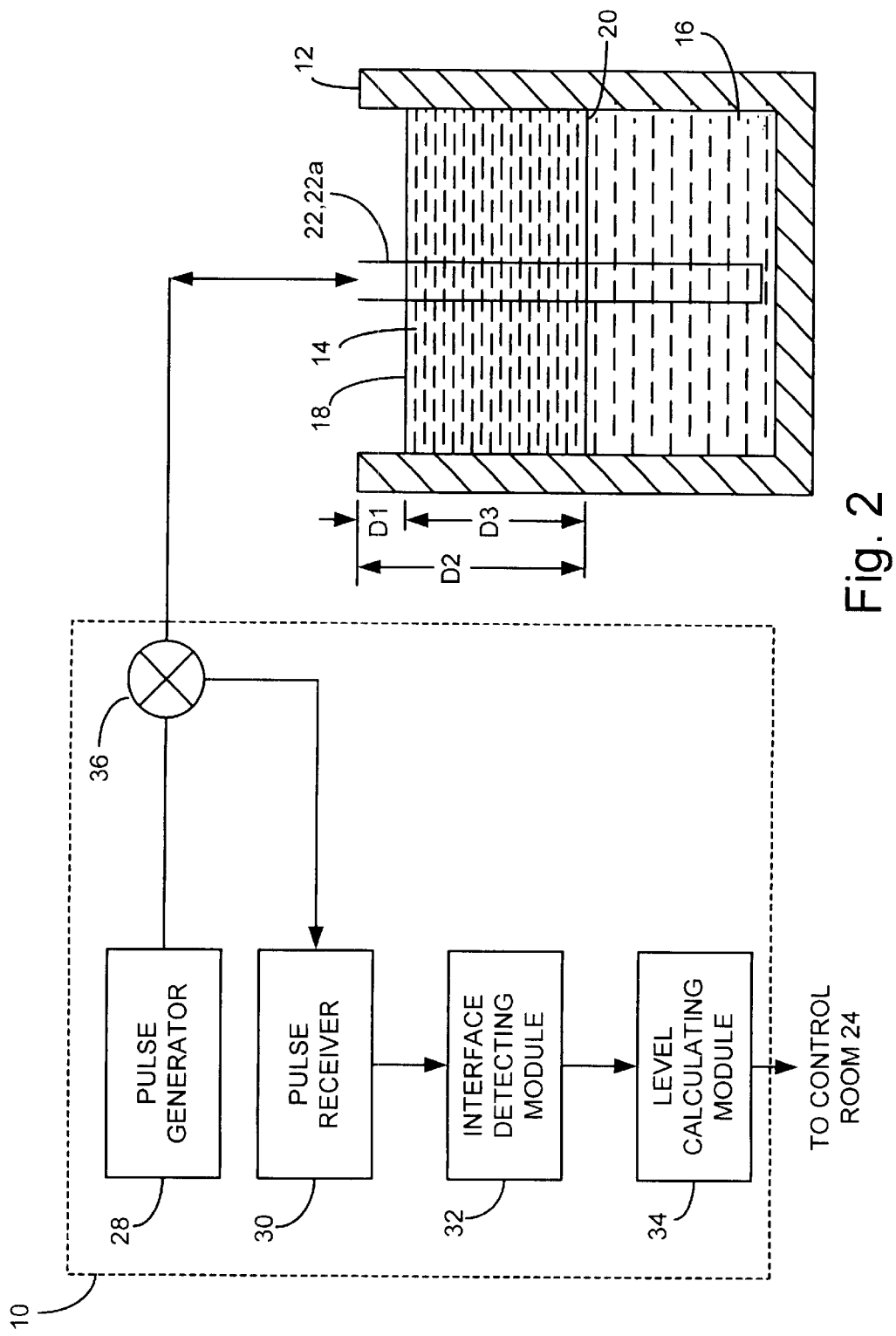
FIG. 2 is a simplified block diagram of a microwave level transmitter in accordance with an embodiment of the invention.

FIG. 2 shows a simplified block diagram of one embodiment of microwave level transmitter 10 which includes pulse generator 28, pulse receiver 30, interface detecting module 32, and level calculating module 34. Pulse generator 28 and pulse receiver 30 are electronically coupled to radar antenna 22, depicted as waveguide 22*a*, through directional coupler 36. Pulse generator 28 is adapted to transmit a microwave pulse through directional coupler 36 to radar antenna 22 and to transmit the microwave pulse into first and second materials 14, 16. Pulse receiver 30 is configured to receive reflected wave pulses corresponding to portions of the microwave pulse that are reflected off discontinuities within tank 12 and to produce an echo profile containing the amplitude of the reflected wave pulses as a function of time at which they were received by pulse receiver 30. Pulse receiver 30 is further configured to filter the echo profile to produce a waveform 40, such as that shown in FIG. 3.

Figure 3:
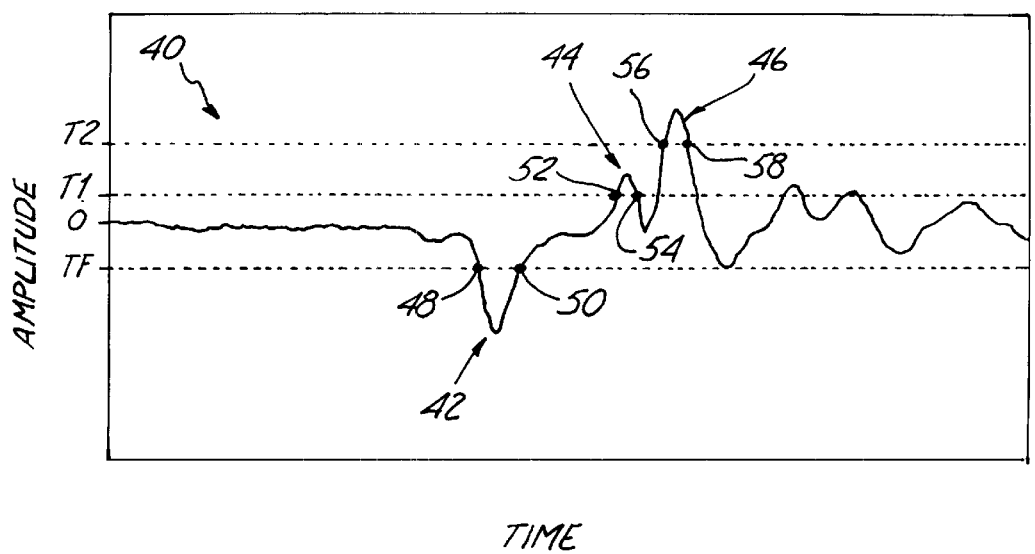
FIGS. 3 and 4 are waveforms generated by a microwave level transmitter in accordance with an embodiment of the invention.

Waveform 40 includes fiducial pulse 42, first received wave pulse 44, and second received wave pulse 46, as shown in FIG. 3. Fiducial pulse 42 typically represents the time at which the microwave pulse was transmitted into tank 12 by pulse generator 28. Fiducial pulse 42 can be used as a reference time location, from which, the round-trip travel times of first and second received wave pulses 44, 46 (i.e., from transmitter 10 to the respective first and second material interfaces 18, 20 and back to transmitter 10) can be measured.

Interface detecting module 32 (FIG. 2) is generally configured to receive waveform 40 from pulse receiver 30 and to detect the time locations of fiducial pulse 42, and first and second received wave pulses 44, 46. The methods used by interface detecting module 32 to detect the time locations of the received wave pulses will be discussed in greater detail below. Once detected, the times locations of received wave pulses 44, 46 are provided to level calculating module 34 as interface detection information.

Level calculating module 34 uses the interface detection information, which includes the time locations of the received wave pulses 42, 44, 46, to establish the round-trip travel times for first and second received wave pulses 44, 46 and calculates the levels D1 and D2 (FIG. 2) corresponding to the distances from microwave level transmitter 10 to first and second material interfaces 18, 20, respectively, using known TDR principles. Level calculating module 34 produces an output signal relating to the levels of first and second material interfaces 18, 20 that can be received by control room 24 over control loop 26, as previously discussed.

Additional calculations can be performed on the information produced by level calculating module 34 to determine the volumes of first and second materials 14, 16 contained in tank 12. For example, the volume of first material 14 can be determined by multiplying the area of tank 12 by the height D3 (FIG. 2) of first material 14. Height D3 is obtained by subtracting D1 from D2. Similarly, the volume of second material 16 can be determined by multiplying the area of tank 12 by the difference between distance D2 and the distance from microwave level transmitter 10 to the bottom of tank 12. One skilled in the art will appreciate that tank 12 can have a shape other than that depicted in FIGS. 1 and 2, and, although the complexity of the equations used to determine the levels D1 and D2 and volumes of first and second materials 14, 16 may increase, these values can still be determined with relative ease. These calculations can be performed by microwave level transmitter 10 or by processing electronics located externally to microwave level transmitter 10, such as in control room 24.

Interface detecting module 32 is generally configured to detect the time locations of fiducial pulse 42, first received pulse 44, and second received pulse wave 46 contained in waveform 40. A discussion of the general method used by interface detection module 32 will be discussed first, followed by the method used to detect first and second received wave pulses 44, 46 when they are in close proximity to one another.

One embodiment of the general method used by interface detection module 32 to detect fiducial pulse 42 and first and second received wave pulses 44, 46 utilizes threshold amplitudes which correspond to each of the received wave pulses 42, 44, 46, respectively, as shown in FIG. 3. The threshold values are typically set in accordance with the expected amplitude of the received wave pulse that is to be detected, such that if waveform 40 crosses the threshold value, then it can be presumed that the received pulse wave corresponding to the threshold value is present. Fiducial threshold value TF is defined to detect fiducial pulse 42, first threshold value T1 is defined to detect first received wave pulse 44, and second threshold value T2 is defined to detect second received wave pulse 46. Threshold values T1 and T2 can be set at the same amplitude since first and second receive wave pulses 44, 46 can be distinguished by their time locations. Fiducial pulse 42 can be detected by interface detecting module 32 by locating points 48 and 50 corresponding to the time locations where waveform 40 crosses or at least meets fiducial threshold value TF. Similarly, first received wave pulse 44 can be detected by locating points 52 and 54 where waveform 40 crosses or at least meets first threshold value T1, and second received wave pulse 46 can be detected by locating points 56 and 58 where waveform 40 crosses or at least meets second threshold value T2.

In one embodiment, interface detecting module 32 uses the peak values of pulses 42, 44, 46 to establish their time location. For example, the time location of first received wave pulse 44 can be established by searching for the peak value (absolute value) waveform 40 reaches between points 52 and 54. In another embodiment, interface detecting module 32 detects the time locations of received wave pulses 42, 44, and 46 by calculating the midpoint between the points of waveform 40 which cross the corresponding threshold value. Accordingly, this embodiment of interface detecting module 32 would select the midpoint between points 52 and 54 as the time location of the first received wave pulse 44.

The above-discussed general method relies upon the ability to locate first and second received wave pulses 44, 46 by determining the points at which waveform 40 crosses first and second threshold values T1 and T2. As the distance between first and second material interfaces 18, 20 decreases, the corresponding first and second received wave pulses 44 and 46 begin to overlap. The general method fails to detect the first and second material interfaces 18, 20 when first and second received wave pulses 44, 46 overlap to the extent that the points 52 and 54 encompass both first and second received wave pulses 44, 46, or, in other words, when waveform 40 contains twin peak pulse 60, as shown in FIGS. 4 and 5.

Figure 4:
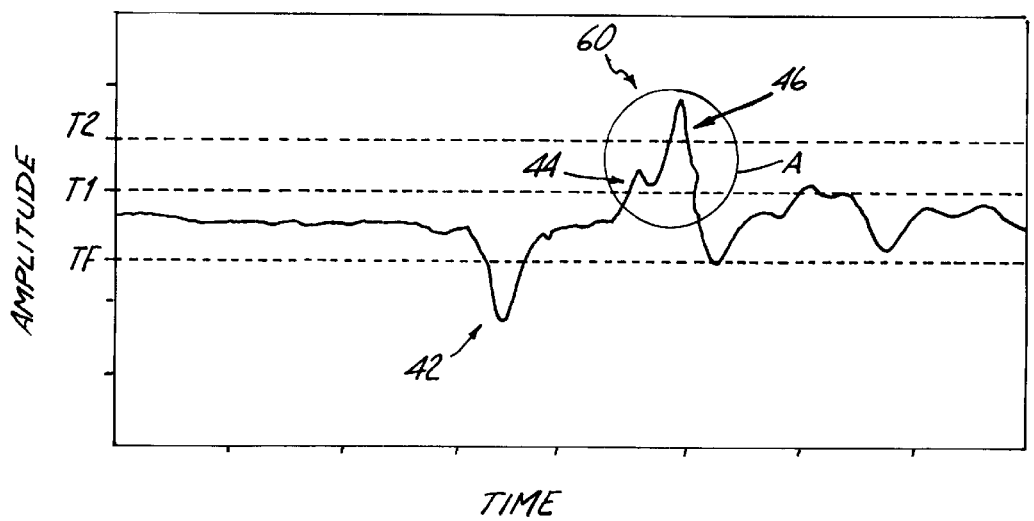

Twin peak pulse 60, shown in FIG. 4, is defined as a portion of waveform 40 that lies above first threshold value T1 and contains the peaks of both first and second received wave pulses 44, 46. FIG. 5 shows a magnified view of the portion of FIG. 4 within circle A. Twin peak pulse 60 is further defined by points 52 (starting point) and 54 (ending point) where waveform 40 crosses first threshold value T1. Twin peak pulse 60 of waveform 40 is defined as having first peak point 62, valley 64, and second peak point 66, as shown in FIG. 5. First peak point 62 relates to the time location of first received wave pulse 44 and corresponding first material interface 18. Second peak point 66 relates to the time location of second received wave pulse 46 and corresponding second material interface 20. Valley 64 is located between first and second peak points 62, 66 and lies above first threshold value T1.

Figure 5:
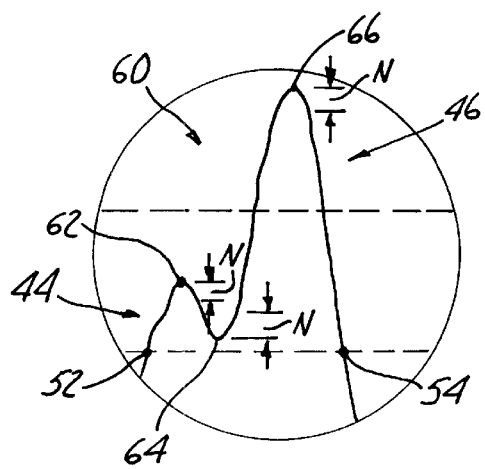
FIG. 5 is a magnified view of the portion of FIG. 4 contained in circle A.

In one embodiment of twin peak pulse 60, first peak point 62 is defined as a point along waveform 40, after starting point 52, where a slope sign of waveform 40 changes and, after which, the amplitude of waveform 40 changes by an amount that exceeds noise margin N prior to waveform 40 having a subsequent slope sign change, as shown in FIG. 5. One algorithm for recognizing valley 64 is to search for a point along waveform 40, after first peak point 62 and above first threshold value T1, where the slope sign of waveform 40 changes and, after which, the amplitude of waveform 40 changes by an amount that exceeds noise margin N prior to a subsequent slope sign change of waveform 40.

Referring now to the flowchart shown in FIG. 6, a general method used by interface detecting module 32 to detect the existence of a twin peak pulse 60 of a waveform 40 and establish the time locations of first and second received wave pulses 44, 46 will be discussed. After receiving a waveform 40 from pulse receiver 30 at step 70, interface detecting module 60 detects starting point 52 where waveform 40 at least meets threshold value T1, at step 72. At step 74, interface detecting module detects first peak 62 of waveform 40 as defined above. At step 76, interface detecting module 32 attempts to detect valley 64 of waveform 40. If waveform 40 does not contain a twin peak pulse 60, such as in the waveform 40 depicted in FIG. 3, interface detecting module 32 will not detect a valley 64. In that case, waveform 40 would not contain a twin peak pulse 60 and interface detecting module 32 would continue to search for a second received pulse wave 46 in accordance with the general methods discussed above as indicated at step 78. On the other hand, the detection of a valley 64 by interface detecting module 32 indicates the existence of a twin peak pulse 60. In that case, interface detecting module 32 detects second peak point 66 as indicated at step 80.

Figure 7:
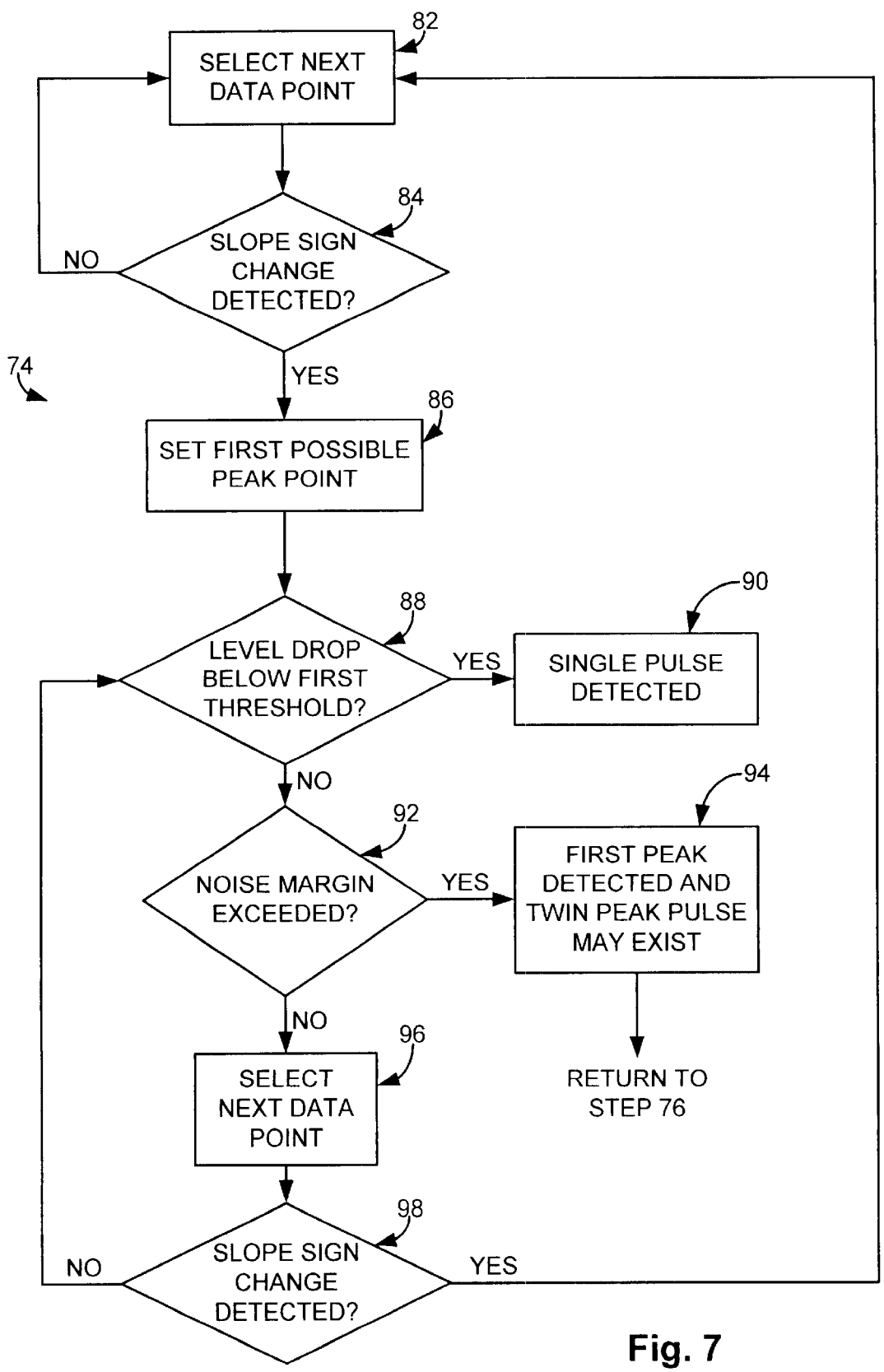

Waveform 40 generated by pulse receiver 30 preferably consists of digital samples each having an amplitude and a specific time location. One embodiment used by interface detecting module 32 to detect first peak point 62 is illustrated in the flow chart of FIG. 7. At step 82, the next data point from the data point relating to starting point 52 is selected. It is not necessary for interface detecting module 32 to analyze each data point sequentially. Instead, the "next" data point selected by interface detecting module 32 could be several data points away from the previously selected data point or an average of several data points, in order to reduce the processing performed by interface detecting module 32.

At step 84, interface detecting module 32 determines whether waveform 40 has undergone a slope sign change. A slope sign change of waveform 40 occurs when the current slope of waveform 40 changes from positive to negative, negative to positive, positive to zero, or negative to zero. For the example of waveform 40 shown in FIG. 5, the slope of waveform 40 is positive at starting point 52 and interface detecting module 32 will be searching for a change in the slope sign of waveform 42 to negative. Interface detecting module 32 calculates the current slope of waveform 40 by dividing the amplitude difference between the currently selected data point and the previously selected data point by the time between them. The calculated slope is then compared to a previous slope calculation. In other words, interface detecting module 32 maintains a history of the slope of waveform 40 and compares the current slope of waveform 40 to a previous slope of waveform 40 at step 84. If interface detecting module 32 does not detect a slope sign change of waveform 405 the method returns to step 82 where the next data point of waveform 40 that is to be analyzed is selected and the slope of waveform 40 and the method continues.

If a slope sign change is detected at step 84, the method moves to step 86 where the previously selected data point waveform 40 is marked or set as a possible first peak point 62 and the method moves to step 88. In another embodiment, the currently selected data point is set as the possible first peak point 62. At step 88, interface module 32 determines whether the level (amplitude) of the currently selected data point has dropped below first threshold value T1. If it has, then only a single received wave pulse 44 was detected and waveform 40 does not contain a twin peak pulse 60, as indicated at step 90. Interface detecting module 32 can then continue with the general method for detecting second received wave pulse 46. If the level of the currently selected data point is above first threshold value T1, interface detecting module 32 determines whether noise margin N (FIG. 5) is exceeded. Noise margin N is used to take into account the affect noise may have on the shape of waveform 40 and to prevent false slope sign change detection by interface detecting module 32. At step 92, interface detection module 32 compares noise margin N to the difference between the level of the currently selected data point and the level of the possible first peak point 62 that was set at step 86. If noise margin N has been exceeded, then the possible first peak point 62 that was set at step 86 becomes the actual first peak point 62 whose time location can be used by level calculating module 34 to determine the time location of first received wave pulse 44, at step 94. The method can then return to step 76 of FIG. 6. If noise margin N is not exceeded at step 92, the method moves to step 96 where the next data point is selected by interface detecting module 32. Thus, steps 88 and 92 are intended to detect a first peak characterizing data point that indicates whether the selected data point is either a single received wave pulse, the first received wave pulse, or noise.

At step 98, interface detecting module 32 determines whether waveform 40 has undergone a subsequent slope sign change in the same manner as described at step 84. If a subsequent slope sign change is not detected, the method returns to step 88 and continues as previously discussed. If a subsequent slope sign change is detected at step 98, the method returns to step 82 where another data point is selected by interface detecting module 32 and the method continues.

Figure 6:
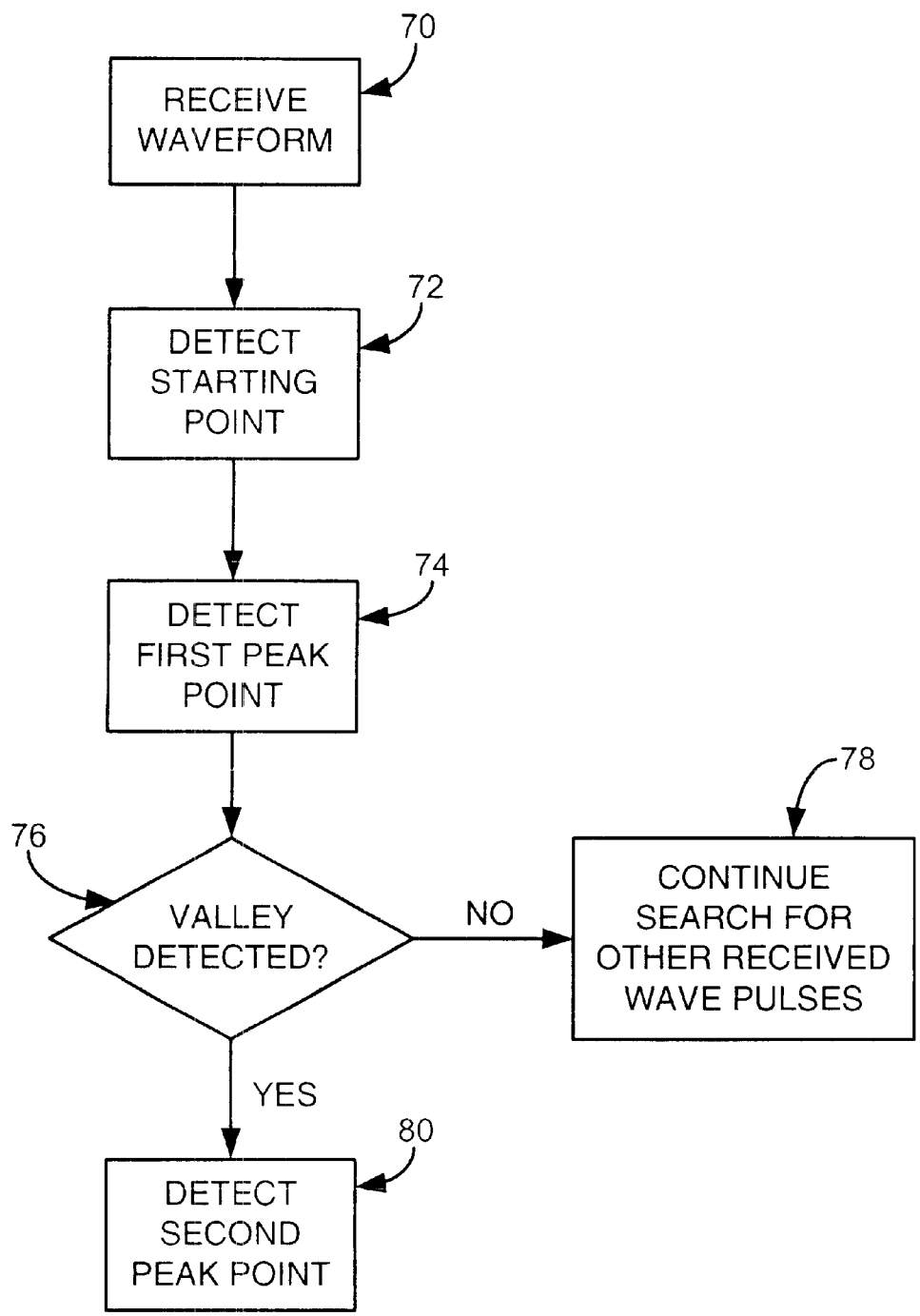
FIGS. 6–9 are flowcharts illustrating methods implemented by a microwave level transmitter in accordance with various embodiments of the invention.
Figure 8:
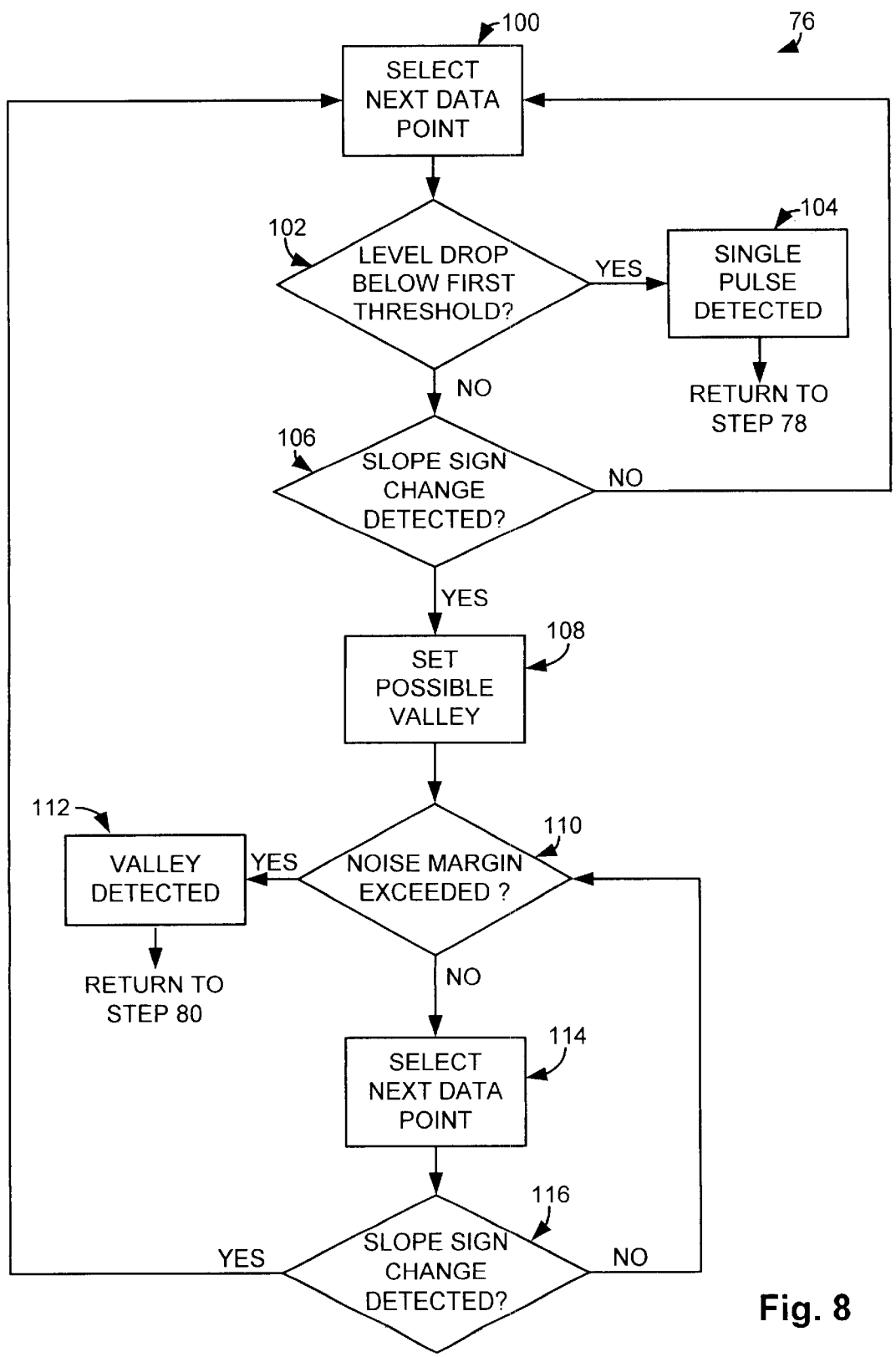

One embodiment of step 76 of the method depicted in FIG. 6 is shown in the flow chart of FIG. 8. In this embodiment, the method continues to analyze data points of waveform 40 following the detection of first peak point 62 from step 74 and determines whether waveform 40 either drops below first threshold value T1 indicating that only first received wave pulse 44 is present, or undergoes a slope sign change above first threshold value T1. indicating that waveform 40 contains a twin peak pulse 60. This embodiment of step 76 begins at step 100 by selecting a data point of waveform 40 after the previously selected data point from step 74. At step 102, interface detecting module 32 determines whether the level of the selected data point is below first threshold T1. If the level or amplitude of the selected data point is below first threshold value T1, waveform 40 does not contain a twin peak pulse 60 and interface detecting module 32 can continue using the general method discussed above to detect second received wave pulse 46. If the amplitude of the selected data point is not below first threshold value T1, the method moves to step 106 and interface detecting module 32 determines whether waveform 40 has undergone a slope sign change. If interface detecting module 32 does not detect a slope sign change at step 106, the method returns to step 100 where the next data point of waveform 40 is selected and the method continues. If a slope sign change is detected at step 106 the method moves to step 108 where the previously selected data point is set as a possible valley 64.

The method next moves to step 110 where interface detecting module 32 determines whether noise margin N (FIG. 5) has been exceeded by comparing noise margin N to the difference between the amplitude of the current data point and the possible valley 64 that was set at step 108. If noise margin N is exceeded, waveform 40 contains a twin peak pulse 60 and the data point that was set as a possible valley 64 at step 108 is set as valley 64 at step 112 and the method returns to step 80 (FIG. 6). Steps 110 and 102 are used to determine whether a selected data point is a valley characterizing data point that has an amplitude that is indicative of either a valley 64 or noise. The method moves to step 114 if noise margin N has not been exceeded by the current data point. At step 116, the currently selected data point is compared to the previously selected data point to determine whether waveform 40 has undergone a subsequent slope sign change. If a subsequent slope sign change is not detected at step 116, the method returns to step 110 and continues as previously discussed. If interface detecting module 32 detects a subsequent slope sign change at step 116, the method returns to step 100 and starts over.

Figure 9:
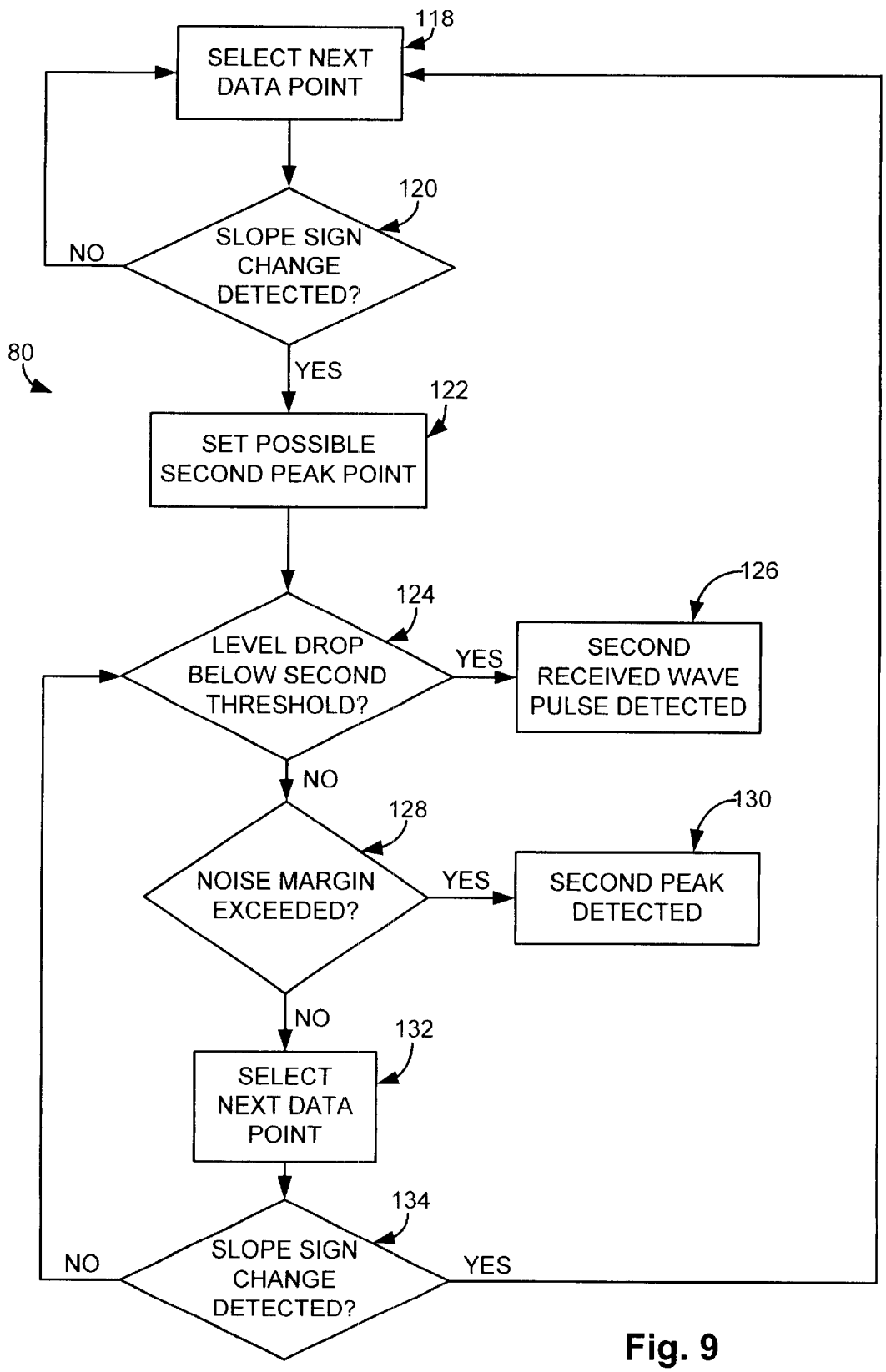

Referring again FIG. 6, if interface detecting module 32 determines that wave form 40 contains a twin peak pulse 60 due to the existence or detection of first peak point 62 and valley 64, interface detecting module 32 can search for second peak point 66 as indicated at step 80. One embodiment of step 80 is shown in the flow chart of FIG. 9. In this embodiment, interface detecting module 32 begins by selecting a data point of waveform 40 following the previously selected data point from step 76, at step 118. At step 120, interface detecting module 32 determines whether waveform 40 has undergone a slope sign change. If a slope sign change is not detected at step 120, the method returns to step 118 where the next data point is selected. If a slope sign change is detected at step 120, the method moves to step 122 where the previously selected data point is set as a possible second peak point 66.

This embodiment of step 80 is described assuming that first and second threshold values T1, T2 are set at the same amplitude. However, if first and second threshold values T1, T2 were different, he method would require an additional step of comparing the amplitude of the possible second peak point 66 to second threshold value T2.

Interface detecting module 32 next determines whether the current selected data point has an amplitude that is below second threshold value T2, at step 124. If the data point has an amplitude that is below second threshold value T2, then the second received wave pulse 46 has been detected, as indicated at step 126. If the level of the selected data point exceeds second threshold value T2, interface detecting module 32 determines whether noise margin N (FIG. 5) has been exceeded at step 128. If noise margin N has been exceeded, then the possible second peak point set at step 122 can be set as the actual second peak point 66 and can be used as the time location of second received wave pulse 46, at step 130. If noise margin N is not exceeded at step 128, interface detecting module 32 selects the next data point of waveform 40, as indicated at step 132, and interface detecting module 32 determines whether waveform 40 has undergone a subsequent slope sign change, at step 134. If a subsequent slope sign change is not detected at step 134, the method returns to step 124 and continues as previously discussed. If a subsequent slope sign change is detected at step 134, the method continues at step 118.

Using the above-described methods, interface detection module 32 can detect the existence of a twin peak pulse in waveform 40 by detecting first peak point 62 and valley 64. If interface detection module 32 detects a twin peak pulse in waveform 40, interface detection module 32 continues to analyze waveform 40 for second peak point 66. However, if interface detection module 32 does not detect a twin peak pulse, ice., valley 64 was not detected, interface detection module can continue searching for other received wave pulses, such as second received wave pulse 46, using the general received wave pulse detection method. In this manner, interface detection module 32 avoids over-analyzing waveform 40 for a non-existent or undetectable second peak point 66.

In accordance with one embodiment of the invention, interface detection module 32 uses time locations of peak points 62, 66 as the time locations of received wave pulses 44, 46. Accordingly, these time locations are used by level calculating module 34 to calculate the levels of corresponding first and second material interfaces 18, 20.

In another embodiment of the invention, interface detection module 32 selects at least one pair of digital samples of waveform 40 that flank first peak point 62. The pair of digital samples are preferably each spaced an equal number of digital samples away from first peak point 62. Next, first peak point 62 and the pair of digital samples are fit to a first parabolic curve. Finally, the time location of first received wave pulse 44 is set at the time location where the first parabolic curve has a slope of zero. The time location of second received wave pulse 46 can be established in a similar manner. First, interface detection module 32 selects a pair of digital samples that flank second peak point 66 and, preferably, are spaced an equal number of digital samples away from second peak point 66. Next, second peak point 66 and the flanking digital samples are fit to a second parabolic curve. The time location of second received wave pulse 46 is set by interface detection module 32 as the time location where the second parabolic curve has a slope of zero. This embodiment of interface detection module 32 allows for more accurate detection of the time locations of first and second received wave pulses 44, 46 and corresponding first and second material interfaces 18, 20.

Although the present invention has been described with reference to preferred embodiments, workers skilled in the art will recognize that changes may be made in form and detail without departing from the spirit and scope of the invention.

What is claimed is:

1. A method of detecting a twin peak pulse in a waveform generated by a pulse receiver of a microwave level transmitter used to detect material levels in a tank, the twin peak pulse including overlapping first and second received wave pulses reflected from first and second material interfaces, respectively, the method comprising:

(a) detecting a first peak point of the waveform corresponding to the first received wave pulse; whereby a level of the first material interface can be calculated using the first peak point; and (b) detecting a valley of the waveform after detecting the first peak point, wherein the detection of the first peak point and the valley indicates that the waveform contains a twin peak pulse.

2. The method of claim 1, further comprising detecting a second peak point corresponding to the second receive wave pulse when the waveform contains a twin peak pulse, whereby a level of the second material interface can be calculated using the second peak point.

3. The method of claim 1, wherein:

the waveform includes a starting point defined as point along the waveform having an amplitude that at least meets a first threshold value corresponding to the first received wave pulse;

the first peak point is defined as being located along the waveform after the starting point, where a slope sign of the waveform changes and, after which, the amplitude of the waveform changes by an amount that exceeds a noise margin prior to the slope sign of the waveform changing, wherein the first peak point relates to the first material interface.

4. The method of claim 3, wherein the valley is defined as being located after the first peak point, where the slope sign of the waveform changes and, after which, the amplitude of the waveform changes by an amount that exceeds the noise margin prior to the slope sign of the waveform changing.

5. The method of claim 1, wherein:

the waveform consists of data points each having an amplitude and a time location; and the detecting step (a) includes:

(i) selecting a starting data point of the waveform having an amplitude that at least meets a first threshold value;

(ii) successively comparing data points of the waveform to detect a slope sign change that is indicative of the first peak point;

(iii) setting a possible first peak point as the time location of the slope sign change; and (iv) successively analyzing the data points of the waveform subsequent to the possible first peak point for a first peak characterizing data point having an amplitude that indicates that the possible first peak point relates to one of a single received wave pulse, the first received wave pulse, and noise, wherein the waveform may contain a twin peak pulse when the first peak point relates to the first received wave pulse.

6. The method of claim 5, wherein the possible first peak point relates to the single received wave pulse when the first peak characterizing data point has an amplitude that is below the first threshold value prior to the slope sign of the waveform changing.

7. The method of claim 5, wherein the possible first peak point relates to the first received wave pulse when the difference between the amplitude of the possible first peak point and the first peak characterizing data point exceeds a noise margin.

8. The method of claim 5, wherein the possible first peak point relates to noise when the difference between the amplitude of the possible first peak point and the first peak characterizing data point does not exceed a noise margin and the first peak characterizing data point relates to a slope sign change of the waveform.

9. The method of claim 5, wherein the detecting step (b) includes:

(i) successively analyzing the data points of the waveform beginning with the first peak characterizing data point to detect one of the slope sign of the waveform changing and the amplitude of the waveform falling below the first threshold value, when the first peak point relates to the first received wave pulse;

(ii) setting a possible valley point at the time location relating to the slope sign of the waveform changing; and (iii) successively analyzing the data points of the waveform subsequent to the possible valley point for a valley characterizing data point having an amplitude that indicates that the possible valley point relates to one of the valley and noise.

10. The method of claim 9, wherein the possible valley point relates to the valley when the difference between the amplitude of the possible valley point and the valley characterizing data point exceeds a noise margin.

11. The method of claim 9, wherein the possible valley point relates to noise when the difference between the amplitude of the possible valley point and the valley characterizing data point does not exceed a noise margin.

12. A method of detecting a twin peak pulse in a waveform and time locations of first and second overlapping received wave pulses of the twin peak pulse, the waveform is generated by a pulse receiver of a microwave level transmitter used to detect material levels in a tank, the first and second received wave pulses corresponding to first and second material interfaces, respectively, the method comprising:

(a) detecting a starting point of the waveform having an amplitude that at least meets a first threshold value corresponding to the first received wave pulse;

(b) detecting a first peak point along the waveform, after detecting the starting point, where a slope sign of the waveform changes and, after which, the amplitude of the waveform changes by an amount that exceeds a noise margin prior to the slope sign of the waveform changing, wherein the first peak point relates to the time location of the first material interface;

(c) detecting a valley along the waveform, after detecting the first peak point, where the slope sign of the waveform changes and, after which, the amplitude of the waveform changes by an amount that exceeds the noise margin prior to the slope sign of the waveform changing, wherein the existence of the first peak point and the valley indicates that the waveform contains a twin peak pulse; and (d) detecting a second peak point along the waveform, after the valley, relating to the time location of the second material interface, whereby the levels of the first and second material interfaces can be calculated using the first and second peak points, respectively.

13. The method of claim 12, wherein detecting step (d) includes locating a point along the waveform, after the valley, where the slope sign of the waveform changes and the amplitude of the waveform reaches an apex.

14. The method of claim 12, wherein detecting step (d) includes locating a point along the waveform, after the valley, where the slope sign of the waveform changes and, after which, the amplitude of the waveform changes by an amount that exceeds the noise margin prior to the slope sign of the waveform changing.

15. The method of claim 12, wherein the second peak point has an amplitude that at least meets a second threshold value.

16. The method of claim 12, wherein:
the waveform consists of digital samples each having an amplitude; and
the method further comprises:
selecting at least a first pair of digital samples that flank the first peak point;
fitting the first pair of digital samples and the first peak point to a first parabolic curve; and
detecting a refined first peak point where the first parabolic curve has a slope of zero, wherein the refined first peak point relates to the time location of the first material interface.

17. The method of claim 16, further comprising:
selecting at least a second pair of digital samples that flank the second peak point;
fitting the second pair of digital samples and the second peak point to a second parabolic curve; and
detecting a refined second peak point where the second parabolic curve has a slope of zero, wherein the refined second peak point relates to the time location of the second material interface.

18. The method of claim 12, further comprising calculating the levels of the first and second material interfaces using the first and second peaks.

19. The method of claim 18, further comprising transmitting an output signal that is indicative of the levels of the first and second material interfaces.

20. A microwave level transmitter used to determine levels of first and second materials contained in a tank, the levels of first and second materials corresponding to first and second material interfaces, respectively, the microwave level transmitter comprising:
a pulse generator adapted to transmit a microwave pulse into the first and second materials using a radar antenna;
a pulse receiver electronically coupled to the radar antenna and adapted to produce a waveform;
an interface detecting module for detecting a twin peak pulse in the waveform having first and second overlapping received wave pulses corresponding to the first and second material interfaces, respectively, the interface detecting module adapted to:
detect a first peak point of the waveform corresponding to the first received wave pulse; and
detect a valley of the waveform after detecting the first peak point, wherein the detection of the first peak point and the valley indicates that the waveform contains a twin peak pulse;
detect a second peak point relating to the second material interface when the waveform contains a twin peak pulse; and
produce interface detection information relating to the first and second peak points when the waveform contains a twin peak pulse; and
a level calculating module coupled to the interface locating module and adapted to calculate the levels of the first and second material interfaces using the interface detection information.

21. The microwave level transmitter of claim 20, wherein the radar antenna is selected from the group consisting of a radiating horn, a rod antenna, and a probe.

22. The microwave level transmitter of claim 20, wherein the level calculating module includes a level output signal indicating the levels of the first and second material interfaces.

23. The microwave level transmitter of claim 22, further comprising a two-wire control loop electronically coupled to the microwave level transmitter and adapted to receive the level output signal.

24. The microwave level transmitter of claim 20, further comprising a two-wire control loop electronically coupled to the microwave level transmitter and a control room, wherein the microwave level transmitter is powered by the control loop.

25. The microwave level transmitter of claim 24, wherein the microwave level transmitter is configured to communicate with the control room over the control loop.

26. The microwave level transmitter of claim 25, wherein the microwave level transmitter communicates with the control room using one of an analog 4–20 mA signal and a digital signal.

27. The microwave level transmitter of claim 26, wherein the digital signal is in accordance with one of a Highway Addressable Remote Transducer (HART®), FOUNDATION™ Fieldbus, and Profibus communication protocols.

28. The microwave level transmitter of claim 20, wherein:
the waveform includes a starting point defined as point along the waveform having an amplitude that at least meets a first threshold value corresponding to the first received wave pulse;
the first peak point is defined as being located along the waveform after the starting point, where a slope sign of the waveform changes and, after which, the amplitude of the waveform changes by an amount that exceeds a noise margin prior to the slope sign of the waveform changing, wherein the first peak point relates to the first material interface.

29. The microwave level transmitter of claim 20, wherein the valley is defined as being located after the first peak point, where the slope sign of the waveform changes and, after which, the amplitude of the waveform changes by an amount that exceeds the noise margin prior to the slope sign of the waveform changing.

30. The microwave level transmitter of claim 20, wherein the second peak point is defined as being located after the valley, where the slope sign of the waveform changes and the amplitude of the waveform reaches an apex.

31. The microwave level transmitter of claim 20, wherein the second peak point is defined as being located after the valley, where the slope sign of the waveform changes and, after which, the amplitude of the waveform changes by an amount that exceeds the noise margin prior to the slope sign of the waveform changing.

32. The microwave level transmitter of claim 20, wherein the second peak point has an amplitude that at least meets a second threshold value.

33. A computer readable medium having stored thereon instructions, executable by an embedded controller in a microwave level transmitter used to detect material levels in a tank, to cause the transmitter to detect a twin peak pulse in a waveform, the twin peak pulse including overlapping first and second received wave pulses reflected from first and second material interfaces, respectively, the instructions comprising:
  (a) detecting a first peak point of the waveform corresponding to the first received wave pulse; whereby a level of the first material interface can be calculated using the first peak point; and
  (b) detecting a valley of the waveform after detecting the first peak point, wherein the detection of the first peak point and the valley indicates that the waveform contains a twin peak pulse.

34. The instructions of claim 33, further comprising detecting a second peak point corresponding to the second receive wave pulse when the waveform contains a twin peak pulse, whereby a level of the second material interface can be calculated using the second peak point.

35. The instructions of claim 33, wherein:
  the waveform includes a starting point defined as point along the waveform having an amplitude that at least meets a first threshold value corresponding to the first received wave pulse;
  the first peak point is defined as being located along the waveform after the starting point, where a slope sign of the waveform changes and, after which, the amplitude of the waveform changes by an amount that exceeds a noise margin prior to the slope sign of the waveform changing, wherein the first peak point relates to the first material interface.

36. The instructions of claim 35, wherein the valley is defined as being located after the first peak point, where the slope sign of the waveform changes and, after which, the amplitude of the waveform changes by an amount that exceeds the noise margin prior to the slope sign of the waveform changing.

37. The instructions of claim 33, wherein:
  the waveform consists of data points each having an amplitude and a time location; and
  the detecting step (a) includes:
    (i) selecting a starting data point of the waveform having an amplitude that at least meets a first threshold value;
    (ii) successively comparing data points of the waveform to detect a slope sign change that is indicative of the first peak point;
    (iii) setting a possible first peak point as the time location of the slope sign change; and
    (iv) successively analyzing the data points of the waveform subsequent to the possible first peak point for a first peak characterizing data point having an amplitude that indicates that the possible first peak point relates to one of a single received wave pulse, the first received wave pulse, and noise, wherein the waveform may contain a twin peak pulse when the first peak point relates to the first received wave pulse.

38. The instructions of claim 37, wherein the possible first peak point relates to the single received wave pulse when the first peak characterizing data point has an amplitude that is below the first threshold value prior to the slope sign of the waveform changing.

39. The instructions of claim 37, wherein the possible first peak point relates to the first received wave pulse when the difference between the amplitude of the possible first peak point and the first peak characterizing data point exceeds a noise margin.

40. The instructions of claim 37, wherein the possible first peak point relates to noise when the difference between the amplitude of the possible first peak point and the first peak characterizing data point does not exceed a noise margin and the first peak characterizing data point relates to a slope sign change of the waveform.

41. The instructions of claim 37, wherein
  the detecting step (b) includes:
    (i) successively analyzing the data points of the waveform beginning with the first peak characterizing data point to detect one of the slope sign of the waveform changing and the amplitude of the waveform falling below the first threshold value, when the first peak point relates to the first received wave pulse;
    (ii) setting a possible valley point at the time location relating to the slope sign of the waveform changing; and
    (iii) successively analyzing the data points of the waveform subsequent to the possible valley point for a valley characterizing data point having an amplitude that indicates that the possible valley point relates to one of the valley and noise.

42. The instructions of claim 41, wherein the possible valley point relates to the valley when the difference between the amplitude of the possible valley point and the valley characterizing data point exceeds a noise margin.

43. The instructions of claim 41, wherein the possible valley point relates to noise when the difference between the amplitude of the possible valley point and the valley characterizing data point does not exceed a noise margin.

44. An interface detecting means for detecting a twin peak pulse in a waveform generated by a pulse receiver of a microwave level transmitter used to detect material levels in a tank, the twin peak pulse containing overlapping first and second received wave pulses reflected from first and second material interfaces, respectively, the interface detecting means comprising:
  means for detecting a first peak point relating to the first received wave pulse and the first material interface, whereby a level of the first material interface can be calculated using the first peak point; and
  means for detecting a valley after detecting the first peak point, wherein the detection of the first peak point and the valley indicates that the waveform contains a twin peak pulse.

45. The apparatus of claim 44, including means for detecting a second peak point when the waveform contains a twin peak pulse, wherein the second peak point relates to the second receive pulse wave and the second material interface, whereby the location of the second material interface can be calculated using the second peak point.

46. The apparatus of claim 45, including means for calculating the location of the first and second material interfaces using the first and second peak points, respectively.

* * * * *